Nov. 6, 1956

T. W. PERRY ET AL 2,769,659

STABILIZER FOR TAIL GATE DOORS MOUNTED ON LATERALLY SPACED HINGES

Filed Jan. 7, 1954

INVENTOR.
Thomas W. Perry and Lawrence P. Schubert
BY
ATTORNEYS.

Nov. 6, 1956
T. W. PERRY ET AL
2,769,659
STABILIZER FOR TAIL GATE DOORS MOUNTED
ON LATERALLY SPACED HINGES
Filed Jan. 7, 1954
2 Sheets-Sheet 2
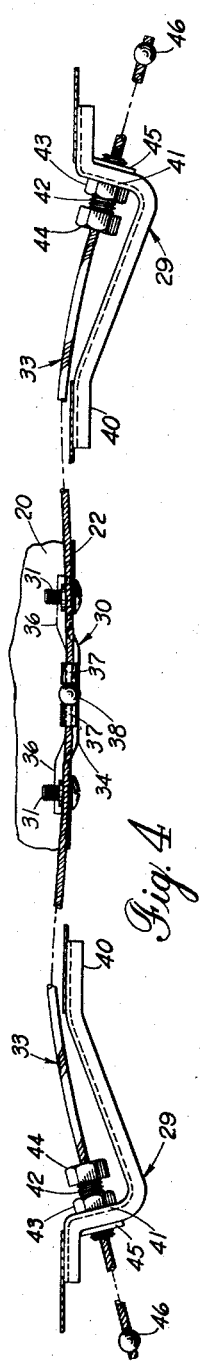
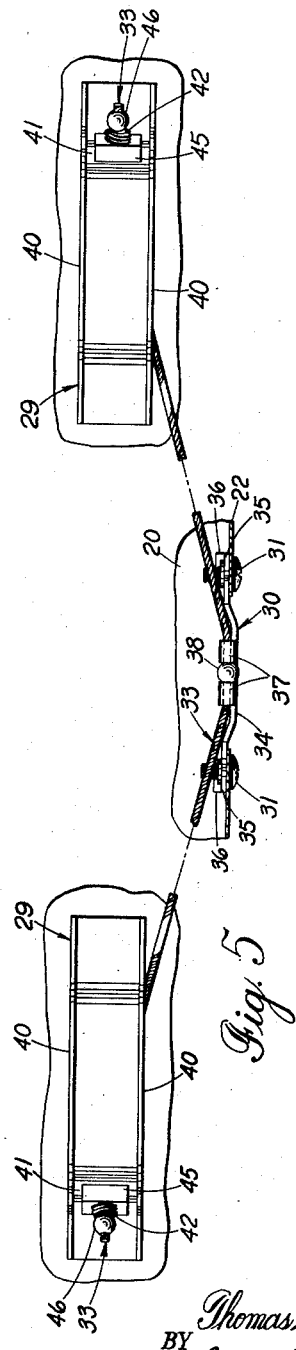
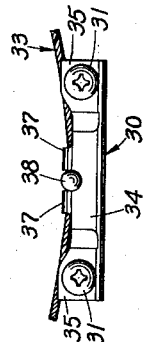
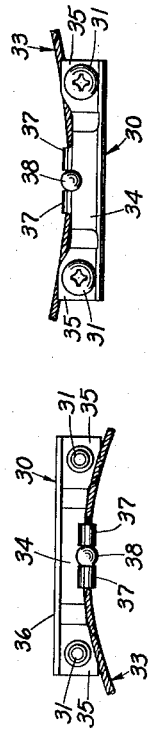
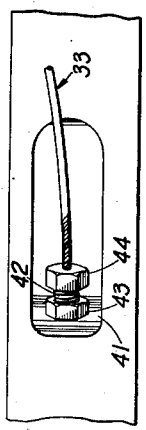
INVENTOR.
Thomas W. Perry and Lawrence P. Schubert
BY
Brown, Jackson, Boettcher & Dienner
ATTORNEYS.

United States Patent Office 2,769,659
Patented Nov. 6, 1956

2,769,659

STABILIZER FOR TAIL GATE DOORS MOUNTED ON LATERALLY SPACED HINGES

Thomas W. Perry and Lawrence P. Schubert, South Bend, Ind., assignors, by mesne assignments, to Studebaker-Packard Corporation, a corporation of Michigan Application January 7, 1954, Serial No. 402,790

7 Claims. (Cl. 296—106)

This invention relates to stabilizers and particularly to stabilizers for tail gates used in station wagons and like automotive vehicles.

A familiar and long standing problem in the automobile industry is confronted in the employment of hinge mounted arcuately swinging tail gate doors and the like, particularly found in the construction of station wagons, panel delivery trucks and like vehicles. The problem of which we speak lies in the difficulty of stabilizing a scissors hinge or other hinge means against lateral thrust when the tail gate door is opened and swung arcuately upward about a generally horizontal axis. Stabilibers of various designs have been presented in the past, but to our knowledge no previous satisfactory solution of this difficulty has been presented.

Generally, the improved stabilizer of our invention is marked by its simplicity of operation and construction and is considered surprising by virtue of its effectiveness and functuality. Briefly, the stabilizer which we propose comprises a cable member, the ends of which are attached adjacent opposite lateral edges of the vehicle's tail gate door and the center portion of which is anchored to the vehicle door framing thus giving a tri-pod stabilizing effect. The outstanding features and principle leading to the successful functioning of such a stabilizer is found in the principle of tensioning the cable when the tail gate door is opened. We have found that by this device, simple though it may be, complete and satisfactory lateral stability for automobile tail gate doors using side mount hinges, for example of the scissors variety, is obtained.

The main object of this invention is to provide a new and improved stabilizer, especially for tail gate doors of station wagons and like automotive vehicles.

A further object of this invention is to provide a new, improved, simplified and substantially inconspicuous stabilizer means to provide a system for laterally stabilizing swinging tail gate doors of station wagons and like vehicles when such are opened.

Still a further object of our invention is to provide a stabilizer of extreme simplicity for laterally stabilizing tail gate doors of station wagons and like vehicles to effect improved economies of production and simplicity and dependability of operation.

The above and further objects features and advantages of our improved tail gate stabilizer will be recognized by those familiar with the art from the following detailed description and specifications therefor and with particular regard to the illustration of its preferred embodiment as found in the accompanying drawings.

In the drawings:

Figure 4 is a cross-sectional view taken substantially along the vantage line 4—4 in Figure 2, such view being illustrative of the disposition of our stabilizer when the tail gate door of the vehicle is closed and showing particularly its mode of attachment to the automobile framing and the framing of the tail gate door;

Figure 5 is a foreshortened partial end elevational view at the juncture of the tail gate door and the framing of the vehicle as taken substantially from vantage line 5—5 of Figure 1;

Figure 6 is an enlarged partial end elevational showing of the means for attaching our improved stabilizer to the framing of the door taken at line 6—6 of Figure 3;

Figure 7 is an enlarged partial top plan view, taken from vantage line 7—7 of Figure 3, to illustrate the preferred mode of attacking the stabilizer of our invention to the framing of the vehicle; and Figure 8 is a bottom plan view, similar to Figure 7, taken at line 8—8 of Figure 3, but viewing the underside of the means for attaching our stabilizer to the vehicle framing.

Figure 1:
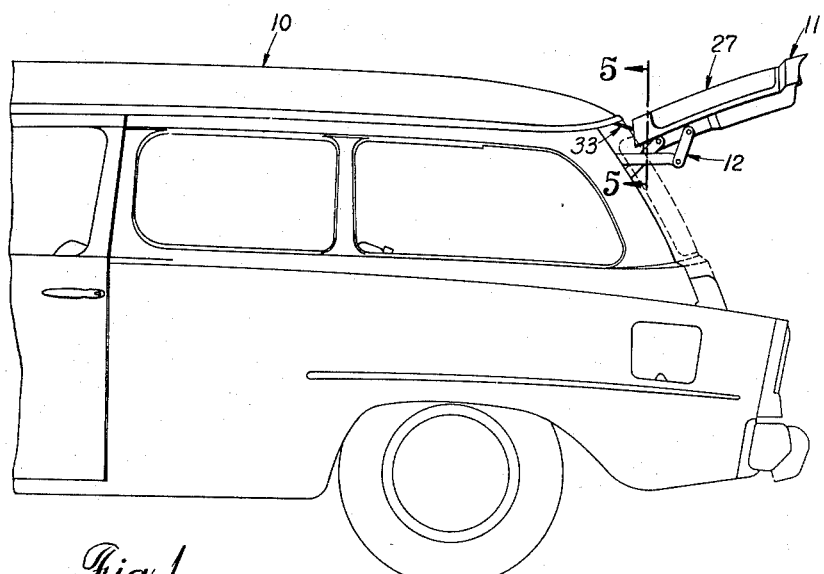
Figure 1 is a partial side elevational view of a typical tail gate door installation as found on the familiar station wagon type of vehicle.

Turning now to the drawings, Figure 1, it will be recognized that a familiar station wagon style of vehicle 10 is equipped with a tail gate door 11 at the rearward end of its body. Such tail gate is supported on scissor hinges 12 of a familiar variety which will not be discussed in detail herein other than to say that the same are arranged and adapted to support the tail gate door for upward arcuate swinging motion about a generally horizontal axis from its normal closed position as illustrated in the drawings. In connection with the hinge means 12 it will be understood that one such set of scissor hinges is provided at each side of the door 11. While the same are satisfactory for supporting the door for the swinging movement, such are characteristically weak against lateral forces and thus require the use of a lateral stabilizer means to support the door and prevent distortion of the hinges.

Figure 2:
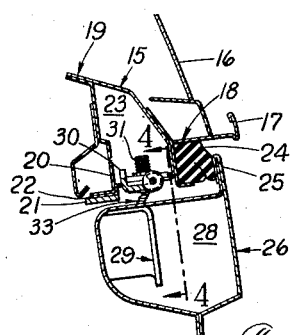
Figure 2 is an enlarged partial cross-sectional view taken substantially along the longitudinal center line of the vehicle at the juncture of the tail gate door and the upper door framing of the vehicle illustrated in Figure 1; the door in Figure 2 being shown partially and in a closed condition.
Figure 3:
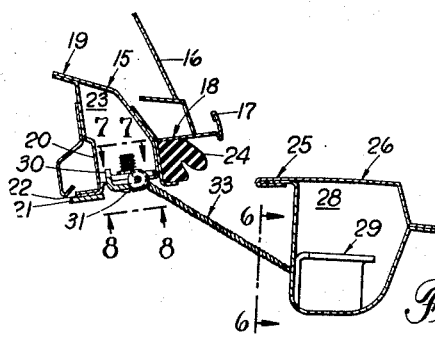
Figure 3 is a cross-sectional view substantially similar to Figure 2 taken at the same cross-sectional line, illustrating the arrangement of our stabilizer and its relation to the tail gate door of the vehicle when the door is opened.

From Figures 2 and 3, it will be understood that the same are sections taken through the body framing immediately above the tail gate door 11 and through the upper portion of the tail gate door itself. Figure 2 demonstrates the usual metal fabricated structure employed for building up a tail gate door frame or jamb as indicated generally by numeral 15; such door frame surrounding and according to the edge contour of the tail gate door 11. Particularly, the frame structure 15 which goes to make up the continuous frame or jamb for door 11 includes a roof plate 16 provided along its lower edge with the usual drain trough or beading 17, a planar platform portion 18 extending inwardly from the drain trough 17, and an angularly disposed frame member 19 extending inwardly and upwardly of the platform 18. Depending from the upper end of angular frame member 19 is a generally vertical metal wall element 20 supporting at its lower end a reinforcing plate 21 which rigidifies the door framing. With further regard to the angular frame member 19, the same is fabricated as a generally C shaped channel member having a lower platform portion 22 extending generally inward toward the vehicle's interior for connection with the lower end of the depending frame member 20. It will thus be recognized that the particular frame construction illustrated in Figure 2 includes or encloses a hollow chamber 23 between channel member 19 and depending wall member 20. Beneath the platform 18 and inwardly of the bead drain 17 is mounted a compressible gasket member 24 which is arranged to seal against a lip portion 25 at the upper edge of the door 11 when the latter is closed. The door 11, in addition to the lip portion 25, also includes a plurality of inter-connected fabricated sheet metal members normally configured and fabricated to form a hollow frame portion 26 surrounding a window area 27 thereof and enclosing an additional hollow chamber 28. Within such chamber 28 are found metal channel bracket members 29.

From Figures 2 and 3 it will be understood that attached centrally to the inwardly extending lower platform portion 22 of the channel member 19 is an attaching bracket element 30 held by bolt means 31 of which there are two, as shown in Figures 4 and 5 of the drawings. The attaching bracket 31 is located substantially midway of the upper edge of the door opening at the rear of the vehicle and relates to our stabilizer which comprises, in the main, a flexible wire cable 33, the approximate center point of which is held by the bracket 30 and the opposite ends of which are held to the channel members 29 located within the chamber 28 adjacent the opposite lateral limits of the door.

A better understanding of the mode of attaching our cable 33 to the jamb or door framing on the vehicle body will be discovered by inspection of Figures 4 through 8 of the drawings. Looking at such figures it will be understood that the bracket 30, as set forth hereinabove, is attached rigidly to the frame member 22 of the door jamb by means of the pair of bolt members 31. In general the bracket 30 is shaped somewhat as a shallow U having an offset central platform portion 34 and end ear portions 35—35. It is through such ear portion 35—35, that bolt members 31 are inserted for attachment to the substantially horizontal lower platform portion 22 of frame member 19. A better visualization of the bracket member 30 may be gained by inspecting Figures 7 and 8 of the drawings, especially, wherein the same is set forth free and clear of the frame members to which it attaches, etc. Particularly, it will be noted that in addition to the platform 34 and the ear portions 35—35 a reinforcing flange 36 is also provided along one edge of the bracket 30 to give the same requisite rigidity and ruggedness. Also platform portion 34 is provided centrally, (along, the edge thereof which is unincumbered by the flange 36) with a pair of separated and generally cylindrical collar elements 37, 37 formed in a familiar manner by rolling over material contiguous of the platform portion. Such collar elements 37—37 are constructed with an internal diameter for the free reception and passage of cable member 33 therethrough. In attaching the cable member 33 to and between the collar members 37 a bead 38, or the like, which may comprise lead or a similar substance capable of being pressed into engagement with the cable after insertion through the collar 37 is utilized; such bead anchoring the approximate center point of the cable to and between the collar elements 37 of the bracket. Other modes of attaching the cable 33 to the bracket will be brought to mind as will different styles of shot or ball members 38. It is perfectly possible and contemplated that the shot or ball member 38 could be permanently attached or affixed to the cable prior to assembly of the cable with the collar members 37 with the collars then being turned over after the cable is placed in its desired position. In any event it is necessary to the success of our invention that the approximate center point of the cable be attached firmly to the central bracket 30 to prevent longitudinal displacement of the cable especially.

With particular regard to Figures 5 and 6 of the drawings, it will be seen that the ends of cable 33 are also attached to the bracket or channel members 29 which are located within the chamber 28 and attached adjacent the upper corners of the door framing. It will be seen also that the channel members 29 are bent or angled inwardly intermediate their ends to provide a generally triangular shaped depression in one face thereof and a corresponding triangular shape projection in the opposite face thereof. Likewise such channel members being C shaped or U shaped in cross-section are provided with edge extending flange portions 40 for reinforcement. In any event the brackets 29 are formed to provide an offset platform portion 41 through which an aperture is formed for the free passage of cable 33. Surrounding the cable 33 at its point of passage through the platform portions 41 is an adjustment sleeve or bolt member 42 having an axially extending opening sufficient for the free passage of the cable 33. The bolt member 42 is provided with external threads along its shank on which is threaded a lock nut 43; the head portion 44 of the bolt 42 and the lock nut 43 being located within the triangular depression of the bracket 29 and along the same side face of said platform portion 41 thereof. Each bolt member 42 also threads into a plate nut 45 located on the opposite face of the platform portion 41 by which means the sleeve-like bolt 42 is threadingly attached to the bracket member number 29. Beyond such nut members 45, the cable 33 is provided with second and third anchor beads or ball members 46—46, there being one such anchor ball at each end of the cable.

Of particular importance with regard to anchoring of the ends of cable 33 by ball members 46—46 and the utilization of lock nut 43 with the threaded sleeve type bolt 42 is the primary consideration that cable 33 must be free for sliding movement through the brackets 29 and that means for adjusting the distance between the central anchor ball 38 and the end anchor balls 46 must be afforded. It will be appreciated, therefore, that the threading movement of bolt 42 through lock nut 43 and the threaded plate nut 45 serves to adjust the effective distance between the spherical face of end anchor balls 46 and the centrally held on fixed mid-point of cable 33.

From the above description of the several elements which go to make up our improved stabilizer it is believed that its features of operation and functions will by now have been recognized. Briefly however, operation of the cable stabilizer is generally as follows:

When the tail gate door 11 is closed over its related opening in the vehicle to blend with the contour of the body, it assumes a generally vertical position, as shown by the dotted lines in Figure 1. Cable 33 at this stage assumes generally the position relative to anchor brackets 29 on the door which is illustrated in Figure 4. That is to say, the cable slips through the adjusting sleeves or bolts 42 so that the end balls 46 thereon are not engaging the ends of the bolts 42 or the plate nut 45 as the case may be, depending on the threaded positioning of bolts 42. Such sliding movement of the cable is preferred to prevent entangling of the cable between the door and the frame structure of the vehicle body into which the same fits. The cable we prefer to use of course, must not only have sufficient strength for the purposes which it is employed, but its lengthwise stiffness or rigidity is also preferably sufficient to permit the same to slip freely through the hollow center of the bolt members 42.

When the door 11 is raised to its open position as shown by the full line drawing thereof in Figure 1, the stabilizing effects and functioning of our device are brought forth. In this respect note Figures 3 and 5 in particular. From these two figures it will be understood that with the door 11 in its fully raised position the end anchor balls 46 are brought tightly into engagement with the adjacent end of the adjusting bolts 42, which bolts are incidently locked in their adjusted position by lock nuts 43, so as to place the cable 33 under lengthwise tension. Such tensioning of the flexible cable, effectively transforms the same into a rigidly acting unit, similar to a solid metal rod under the same circumstance. The tripod effect of the tensioned cable, which is anchored at its center point by ball 38 and prevented from retraction to its normal length when under tension, gives forth improved stabilizing effects on the door 11 preventing lateral movement thereof and distortion or bending of the scissor type hinge structures 12 which support the door.

While we believe that the features and elements of our device are shown herein in a preferred form known to be sucessful for satisfactory operation, it is nevertheless contemplated that numerous changes, modifications and substitutions of equivalents may be resorted to in following the spirit and scope of our invention without necessarily departing from its teachings. As a consequence we do not wish to be limited to the specific embodiment and features of our invention as hereinabove set forth except as may appear in the following appended claims.

We claim:

1. A stabilizer particularly useful for giving lateral stability to automobile tail gate doors which employ hinges attached generally along the side edges of the door, comprising, a cable member, bracket means attached centrally to the upper frame work of the vehicle bordering the opening which the door is designed to cover, end bracket means located substantially adjacent the lateral extremities of said door and near the upper corners thereof, and anchor means on said cable anchoring the same against lengthwise displacement in either direction relative to said central bracket means and against lengthwise displacement in one direction relative to said end bracket means, said stabilizer adapted so that said cable is placed in tension when said door is in an open position.

2. A stabilizer for tail gate doors of automotive vehicles and the like employing lateral hinges located generally at the side edges of said doors and arranged to swing the same arcuately upwardly or downward about a generally horizontal axis, comprising in combination, a cable member, means for attaching the ends of said cable to said door, generally adjacent the upper corners of the latter, bracket means located centrally on the upper edge of the opening which said door is arranged to cover and attached fixedly to the vehicle, anchor means on said cable for effectively preventing lengthwise displacement thereof in either direction relative to said bracket means, and means at the point of attaching the ends of said cable to said door for permitting said cable to slide in one direction relative to said means for attaching the same to said door when such door is closed over said opening.

3. A stabilizer for tail gate doors of automotive vehicles and the like, comprising in combination, a first bracket member attached substantially centrally of the vehicle's framing bordering the upper edge of the opening which the said door is designed to cover, second and third bracket means attached rigidly to said door and generally adjacent the upper corners thereof, a flexible cable member having sliding connection with said second and third bracket members, means anchoring substantially the midpoint of said cable member to said first bracket member and preventing relative longitudinal displacement thereof relative to said first bracket member, and means for adjusting the effective length of said cable between said first and said second and third bracket members, the adjusted length of said cable being such that when said door is swung arcuately away from the body of said vehicle to its fully opened position said cable is placed under lengthwise tension to effectively stabilize said door against lateral displacement.

4. In a vehicle, a frame having an opening therein and a complementary closure means for said opening, said closure means being hinged so that it is swingable about a substantially horizontal axis from a closed position to an open position, stabilizing means to prevent lateral motion of said closure means while in an open position including a cable member attached near its mid point to said frame, said cable member slidably connected at its ends to said closure means, said slidable connection having adjustable limiting means so that said cable member is placed under tension when said closure means is in an open position.

5. In a vehicle, a frame having an opening and a complementary closure means therefor, hinge means to permit said closure means to swing about a substantially horizontal axis from a closed position to an open position, stabilizing means to prevent lateral motion of said closure means while in an open position including a cable member, end and intermediate connecting means to join said cable member to said frame and said closure means, said end connecting means and said intermediate connecting means being disposed with one on the frame and the other on the closure means, said end connecting means being slidably attached to said cable member near its ends, said end connecting means having adjustable limiting means adapted so that said cable is placed under tension when said closure means is in an open position, said end and intermediate connecting means being relatively positioned such that said cable member forms two sides of a triangle when under tension with said intermediate connecting means at the apex thereof.

6. A stabilizer for tail gate doors of automotive vehicles and the like employing lateral hinges located generally at the side edges of said door and arranged to swing the same arcuately upward or downward about a generally horizontal axis, a frame having a tail gate opening, said stabilizer comprising in combination a cable member, end and intermediate bracket means for attaching said cable member to said door and to the frame around the tail gate opening, said end bracket means and said intermediate bracket means being disposed with one on the frame and the other on the door, anchor means on said cable member for effectively preventing lengthwise displacement thereof in either direction relative to said intrmediate bracket means and adjustable limiting means at the end bracket means for limiting sliding movement of the ends of said cable member relative to said end bracket means when said door is moved to an open position.

7. A vehicle having a doorway defined by a frame member, a complementary door member for said doorway, said door member being hinged for movement about a generally horizontal axis from a closed position to an open position, a cable having a midportion thereof fixedly attached to one of said members and the end portions thereof threaded through openings on opposite sides of the other of said members, and abutment means attached to each end of said cable to limit and prevent the withdrawal of the ends of said cable through said openings, said abutment means being positioned to effect tensioning of said cable when said door member is moved to a predetermined open position.

References Cited in the file of this patent

UNITED STATES PATENTS

| | | |
|---|---|---|
| 1,125,982 | Dufala | Jan. 26, 1915 |
| 2,166,898 | Wolf | July 18, 1939 |
| 2,167,557 | Stout | July 25, 1939 |
| 2,246,358 | Jelinek | Jan. 17, 1941 |
| 2,353,175 | Marple | July 11, 1944 |